US009239097B2

(12) United States Patent
Lescorail et al.

(10) Patent No.: US 9,239,097 B2
(45) Date of Patent: Jan. 19, 2016

(54) TENSIONING DEVICE FOR A TRACTION ELEMENT AND METHOD OF INSTALLATION OF SUCH A DEVICE

(71) Applicants: Romuald Lescorail, St. Laurent en Gâtines (FR); Nicolas Tronquoy, Fondettes (FR)

(72) Inventors: Romuald Lescorail, St. Laurent en Gâtines (FR); Nicolas Tronquoy, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 192 days.

(21) Appl. No.: 13/772,435

(22) Filed: Feb. 21, 2013

(65) Prior Publication Data

US 2013/0225341 A1  Aug. 29, 2013

(30) Foreign Application Priority Data

Feb. 27, 2012  (FR) ...................................... 12 00557
Feb. 7, 2013  (FR) ...................................... 13 00248

(51) Int. Cl.
  *F16H 7/10* (2006.01)
  *F16H 7/08* (2006.01)
  *F16H 7/22* (2006.01)
  *F16H 7/12* (2006.01)

(52) U.S. Cl.
  CPC ............... *F16H 7/12* (2013.01); *F16H 7/1281* (2013.01); *F16H 2007/0842* (2013.01); *F16H 2007/0878* (2013.01)

(58) Field of Classification Search
  CPC ................. F16H 2007/081; F16H 2007/0844; F16H 7/1281; F16H 7/1218; F16H 2007/088

USPC ................................................. 474/112, 135
See application file for complete search history.

(56) References Cited

U.S. PATENT DOCUMENTS

| 2,337,591 | A | * | 12/1943 | Coulson ........................ 474/112 |
| 4,472,162 | A | * | 9/1984 | Hitchcock ..................... 474/135 |
| 4,571,222 | A | * | 2/1986 | Brandenstein et al. ........ 474/112 |
| 4,605,387 | A | * | 8/1986 | Okubo et al. .................. 474/112 |
| 4,698,049 | A | * | 10/1987 | Bytzek et al. .................. 474/135 |
| 4,816,011 | A | * | 3/1989 | Kotzab .......................... 474/111 |
| 4,822,322 | A | * | 4/1989 | Martin .......................... 474/135 |
| 4,824,421 | A | * | 4/1989 | Komorowski ................. 474/135 |
| 4,832,665 | A | * | 5/1989 | Kadota et al. ................. 474/112 |
| 4,886,483 | A | * | 12/1989 | Henderson .................... 474/135 |
| 4,904,230 | A | * | 2/1990 | Kawashima et al. .......... 474/112 |
| 4,906,222 | A | * | 3/1990 | Henderson .................... 474/135 |
| 4,923,435 | A | * | 5/1990 | Kadota et al. ................. 474/112 |
| 4,934,987 | A | * | 6/1990 | Kadota et al. ................. 474/112 |
| 4,985,010 | A | * | 1/1991 | Henderson .................... 474/135 |

(Continued)

FOREIGN PATENT DOCUMENTS

DE        4223325 C1    10/1993
DE   WO 2012/028354   *  8/2012  .............. F16H 7/08

(Continued)

*Primary Examiner* — Henry Liu
(74) *Attorney, Agent, or Firm* — Bryan Peckjian; SKF USA Inc. Patent Dept.

(57) ABSTRACT

The invention relates to a tensioning device comprising a back plate, on which is installed a tensioning roller provided with at least one bearing. The tensioning roller is installed on the back plate with the possibility of rotation about an eccentric axis (X6) in relation to the axis (X4) of the tensioning roller. The tensioning roller is provided with a protuberance engaged in a peripheral recess of the back plate, this peripheral recess limiting the movement of the protuberance between two abutments.

9 Claims, 4 Drawing Sheets

(56) References Cited

U.S. PATENT DOCUMENTS

| | | | |
|---|---|---|---|
| 5,015,216 A * | 5/1991 | Brandenstein et al. | 474/101 |
| 5,015,217 A * | 5/1991 | Henderson | 474/135 |
| 5,030,171 A * | 7/1991 | Henderson | 474/135 |
| 5,052,982 A * | 10/1991 | Ouchi | 474/135 |
| 5,073,148 A * | 12/1991 | Dec | 474/94 |
| 5,190,502 A * | 3/1993 | Gardner et al. | 474/135 |
| 5,254,048 A * | 10/1993 | Gardner et al. | 474/135 |
| 5,277,667 A * | 1/1994 | Gardner et al. | 474/135 |
| 5,702,317 A * | 12/1997 | Kawashima et al. | 474/110 |
| 5,752,892 A * | 5/1998 | Taomo et al. | 474/112 |
| 5,820,503 A * | 10/1998 | Bruchner et al. | 474/112 |
| 5,964,674 A * | 10/1999 | Serkh et al. | 474/109 |
| 6,165,091 A * | 12/2000 | Dinca et al. | 474/112 |
| 6,416,435 B1 * | 7/2002 | Szatkowski et al. | 474/112 |
| 6,659,896 B1 * | 12/2003 | Stief et al. | 474/135 |
| 7,285,065 B2 * | 10/2007 | Dinca et al. | 474/112 |
| 7,662,057 B2 * | 2/2010 | Baumuller et al. | 474/112 |
| 7,874,950 B2 * | 1/2011 | Lehtovaara et al. | 474/135 |
| 7,918,755 B2 * | 4/2011 | Baumuller et al. | 474/135 |
| 7,980,976 B2 * | 7/2011 | Stepniak et al. | 474/112 |
| 8,092,327 B2 * | 1/2012 | Kobara et al. | 474/111 |
| 8,926,462 B2 * | 1/2015 | Ward et al. | 474/112 |
| 2003/0109342 A1 * | 6/2003 | Oliver et al. | 474/134 |
| 2003/0216203 A1 * | 11/2003 | Oliver et al. | 474/134 |
| 2005/0003915 A1 * | 1/2005 | Dec | 474/135 |
| 2005/0043130 A1 * | 2/2005 | Hao et al. | 474/135 |
| 2006/0217222 A1 * | 9/2006 | Lolli et al. | 474/134 |
| 2008/0113835 A1 * | 5/2008 | Baumuller et al. | 474/112 |
| 2008/0139353 A1 * | 6/2008 | Stepniak et al. | 474/112 |
| 2008/0194366 A1 * | 8/2008 | Mevissen et al. | 474/135 |
| 2008/0207367 A1 | 8/2008 | Bogner et al. | |
| 2010/0190594 A1 * | 7/2010 | Rolando et al. | 474/112 |
| 2010/0190595 A1 * | 7/2010 | Baumuller et al. | 474/112 |
| 2013/0165284 A1 * | 6/2013 | Mennerat et al. | 474/112 |

FOREIGN PATENT DOCUMENTS

| | | |
|---|---|---|
| EP | 1367297 A2 | 12/2003 |
| WO | WO9928652 A2 | 6/1999 |

* cited by examiner

TENSIONING DEVICE FOR A TRACTION ELEMENT AND METHOD OF INSTALLATION OF SUCH A DEVICE

CROSS-REFERENCE TO RELATED APPLICATION

This application claims priority to French Patent Application No. FR1200557 filed on Feb. 27, 2012 and to French Patent Application No. FR1300248 filed on Feb. 7, 2013, the contents of which are both fully incorporated herein by reference.

FIELD OF THE INVENTION

The present invention relates to a tensioning device for a means of traction in a traction circuit, in particular for a belt or for a chain in an internal combustion engine of an engine vehicle.

BACKGROUND OF THE INVENTION

Such a tensioning device is generally utilized to apply a constant tension to the means of traction within a given range and/or to modify locally the circuit produced by the latter.

Once installed in the traction circuit, the means of traction is driven by at least one engine element, in particular by a crankshaft of the internal combustion engine, and drives at least one element, to which it is connected, and which must be set in motion, in particular a compressor or a generator.

The connections between, on the one hand, the means of traction and the engine element and, on the other hand, the means of traction and the driven element are made by means of pulleys installed on these elements. The means of traction is placed under sufficient tension by being connected to the tensioning device in the traction circuit in order to prevent any slipping on the pulleys and to permit its optimized functioning.

The customary method of installation of a traction element in a traction circuit consists of:
installation of the pulleys connected to the engine elements and the elements to be driven, and at least one tensioning device,
followed by installation of the means of traction around the pulleys and installation of the tensioning device,
and, finally, tensioning of the means of traction by adjustment of the tensioning device.

For this final stage of the method, the utilization of a spring or of a lever arm provided in the tensioning device, for example the device described in US patent application 2008/0207367 A1, is already familiar.

However, such devices require numerous supplementary parts in order to achieve this function, involving a high cost accompanied by a longer installation time for the tensioning device.

Furthermore, the utilization of a spring or of a lever arm in order to ensure tensioning of a means of traction to a desired value causes significant congestion at the level of the traction circuit. For this reason, it cannot be utilized for certain applications of the tensioning device.

The present invention sets out to address these problems in particular by proposing a new tensioning device with a reduced number of parts and with reduced congestion, and by simplifying the method of installation of the means of traction.

SUMMARY OF THE INVENTION

For this purpose, the invention relates to a tensioning device comprising a back plate, on which is installed a tensioning roller comprising at least one bearing supporting a pulley, this tensioning roller being installed on the back plate with the possibility of rotation about an eccentric axis in relation to the axis of the tensioning roller. The back plate is intended to be secured to a wall, whereas the tensioning roller is intended to receive a traction element, such as a belt or a chain, and to ensure the tension thereof.

According to the invention, the tensioning roller is provided with a protuberance engaged in a peripheral recess in the back plate. The peripheral recess is provided with two abutments limiting the movement of the protuberance.

Thanks to the invention, the tensioning roller may be set in rotation between two extreme positions in relation to the back plate, the protuberance of the tensioning roller having a limited travel between the two abutments of the peripheral recess. It is thus possible to have two distinct positions of the tensioning roller, as a first step permitting the means of traction to be installed in a free manner around the tensioning device and then, as a second step causing the tensioning roller to rotate in order to place the means of traction under tension by means of contact with the pulley.

The tensioning device in accordance with the invention contains fewer parts and requires a shorter manufacturing time and a more rapid installation time than with the utilization of a spring or a lever arm.

The recess receiving the protuberance is produced in a peripheral manner on the outer edge of a defined surface on the back plate. Its manufacturing method is particularly simple, and only a reduced volume is required for its realization.

According to advantageous, although not mandatory, aspects of the invention, such a tensioning device may incorporate one or a plurality of the following characterizing features in any technically acceptable combination:
The tensioning roller is provided with at least one bearing comprising an inner ring and an outer ring, between which is defined a bearing housing, into which rolling elements, such as balls, are inserted.
The outer ring is installed in a bore of the pulley of the tensioning roller and is retained by axial abutments.
The axial abutments maintaining the outer ring of the bearing in the pulley are provided by shoulders in the bore of the pulley.
The pulley is produced from a polymer or synthetic material and is moulded onto the outer ring of the bearing.
The pulley is produced from a sintered or pressed metallic material or is installed with an interference fit on the outer ring of the bearing.
The pulley is produced from a metallic material and is solid, being provided on its inner annular surface with a bearing raceway permitting a bearing housing for the rolling elements to be defined with the inner ring of the bearing.
The pulley produced in this way serves both as a receiving pulley for a traction element and as an outer ring of the bearing for the tensioning roller.
The tensioning roller is installed securely on a roller support, which is provided with the projecting protuberance and is directed towards the back plate.
The roller support is installed in a bore of the inner ring of the bearing for the tensioning roller and is maintained by axial abutments.
At least one axial abutment maintaining the roller support in the bore of the inner ring is achieved by crimping.
At least one axial abutment maintaining the roller support in the bore of the inner ring is achieved thanks to an annular disc with which the roller support is provided.

The roller support is provided with a housing, into which an operator may insert an appropriate tool to facilitate the securing of the tensioning roller on the back plate.

The back plate and the tensioning roller are each provided with a transcurrent opening facing one towards the other when the two elements are assembled, into which openings a screw is inserted, which permits, on the one hand, the eccentric rotation of the tensioning roller in relation to the back plate and, on the other hand, after final installation, the maintenance of the tensioning roller on the back plate.

The support for the tensioning roller is provided with the transcurrent opening, into which the eccentric screw is inserted.

The back plate has no possibility of movement on the wall where it is intended to be fixed.

The peripheral recess is arranged exclusively on the periphery of the outer edge of a projecting surface on the back plate.

The surface on which the peripheral recess is produced is situated in a middle zone of the back plate.

The peripheral recess is of box-shaped section according to an axial cross section in relation to the axis of rotation of the tensioning roller on the back plate.

The peripheral recess is in the form of a sector of a circle according to a radial cross section in relation to the axis of rotation of the tensioning roller on the back plate.

The peripheral recess is produced on a maximum of one half of the circumference of the projecting surface, and preferentially on one quarter of this circumference.

The tensioning roller cannot be set in rotation beyond a top dead centre point when the tensioning roller is in its normal working position on the engine, being limited by the coming into abutment of the protuberance in the peripheral recess.

The tensioning roller cannot be set in rotation beyond a bottom dead centre point when the tensioning roller is in its normal working position on the engine, being limited by the coming into abutment of the protuberance in the peripheral recess.

The back plate is provided with at least two extremities, each of which has transcurrent openings, into which securing means may be inserted in order to secure the back plate to a wall.

When the tensioning roller is in one or other of its extreme positions of rotation, that is to say when the protuberance is in abutment against one of the two abutments of the peripheral recess, a single transcurrent opening for securing the back plate is accessible by an operator, the other opening being obscured by the tensioning roller in a front view.

The traction means is subjected to a force F1 exerted by the tensioning roller when the protuberance is in contact with the abutment corresponding to the final installed position of the tensioning device in the traction circuit. According to a particularly advantageous embodiment of the invention, there is an intermediate position for the protuberance in the peripheral recess in the back plate, with no contact with any of the two abutments, so that the traction means is subjected to a force F2 exerted by the tensioning roller strictly greater than F1 when the protuberance is in this intermediate position.

By virtue of this embodiment, the tensioning device is provided with an anti-return blocking means in case of release of the screw-securing of the tensioning roller on the back plate, thus preventing the rotation of the tensioning roller relative to the back plate when said device is operating. Such a rotation during operation would lead to a reduction in the tension exerted on the traction means and degraded operation of the traction circuit.

This is because, once in the final installed position of the tensioning device in the traction circuit, the protuberance of the tensioning roller is in contact with an abutment of the peripheral recess and the traction means is subjected to a force F1 by the tensioning roller. In case of release of the securing of the tensioning roller on the back plate, the tensioning roller will have a tendency to be set in rotation in relation to the back plate, in such a way that the protuberance is made to move in the peripheral recess. However, the protuberance, in approaching the intermediate position in the peripheral recess, demands an increase in the force exerted on the traction means by the tensioning roller in order to apply tension to the value F2. This creates a resistance to the rotation of the tensioning roller and blocks it in this intermediate position.

Such an embodiment of an anti-return blocking means is obtained solely by the dimensioning of the tensioning roller and of the traction circuit in which it is installed, with no additional part.

The invention also relates to an engine equipped with at least one traction circuit driven by a traction element such as a chain or a belt, and equipped with a tensioning device as stated above.

In an advantageous manner, the back plate is installed without the possibility of movement on a wall of the engine.

The present invention also relates to a method for the installation of a tensioning device in an engine, this method comprising at least the following successive stages:

a) during a preliminary stage, a traction circuit is installed on a wall of the engine, in particular comprising pulleys connected to engine elements and to elements to be driven, and a means of traction, for example a belt or a chain, is installed around the pulleys, b) a tensioning device is put in position in the traction circuit, the said tensioning device having a tensioning roller with a protuberance in contact with an abutment on a back plate, the means of traction being positioned around the tensioning device, c) a first transcurrent opening in the back plate is freely accessible by an operator, who inserts a securing element into it in such a way as to secure the back plate to the wall, d) the tensioning roller is set in rotation by an operator in such a way that the protuberance engages in a peripheral recess in the back plate between two abutments, thereby placing the means of traction under tension, e) a second transcurrent opening in the back plate is freely accessible by the operator, who inserts a securing element into it in such a way as to secure the back plate permanently to the wall, f) at the same time, the operator tightens a screw with a first appropriate tool while maintaining the tensioning roller in position by the insertion of a second tool into a housing made in the tensioning roller, in such a way as to secure the tensioning roller in position on the back plate.

Thanks to the invention, the installation of the tensioning device does not require a large volume as a result of a reduced dimension of the back plate. The tensioning of the means of traction is achieved simply by rotation of the tensioning roller between a first and a second position.

Furthermore, the rotation of the tensioning roller is limited because of the shortness of the available travel for the protuberance in the peripheral recess, although it is nevertheless sufficient.

BRIEF DESCRIPTION OF THE DRAWINGS

The invention will be more easily understood, and its other advantages will be appreciated more clearly in the light of the following description of an embodiment of a tensioning device that is compatible with its principle, and is given solely by way of example and is made with reference to the accompanying drawings, in which.

DETAILED DESCRIPTION OF THE INVENTION

Figure 1:
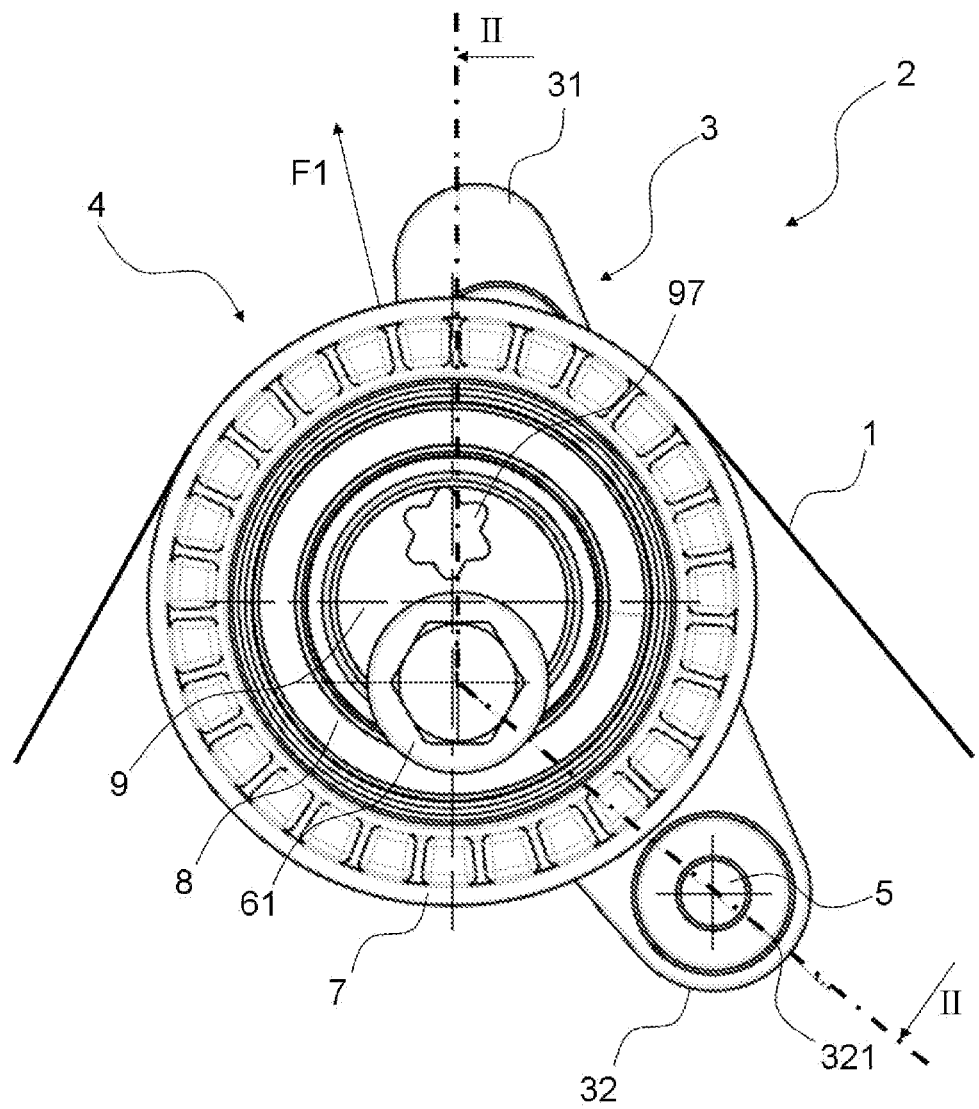
FIG. 1 is a front of a tensioning device in accordance with the invention.

In a traction circuit, not illustrated here, a means of traction, for example a belt 1 in this case, is installed around pulleys in order to transmit the rotational movement of at least one driving pulley to at least one driven pulley, these pulleys not being illustrated here.

The traction circuit is also provided with a tensioning device 2, around which the belt 1 is installed.

The tensioning device 2 comprises a back plate 3, on which a tensioning roller 4 is installed.

The back plate 3 is provided with two transcurrent openings 311 and 321 according to two mutually parallel axes X31 and X32. These transcurrent openings 311 and 321 are positioned essentially at extremities 31 and 32 of the back plate 3, for the purpose of inserting securing elements 5 at that point for securing the back plate 3 and, as a consequence, the tensioning device 2, without the possibility of movement on the outer wall of the internal combustion engine, which is not illustrated here.

In order to ensure an optimized strength of the back plate 3 on its securing support, the extremities 31 and 32 exhibit a thickness greater than that of a central section 33, thereby forming flat protrusions having a plane contact surface 312 and 322 and being oriented perpendicularly to axes X31 and X32 towards the outer wall on which the back plate 3 is secured.

The back plate 3 is also provided with a transcurrent opening 34 having the axis X34 parallel to the axes X31 and X32 and situated essentially in a middle circular zone 35 of the central section 33. This transcurrent opening 34 is intended to receive a screw 6 ensuring that the tensioning roller 4 is maintained on the back plate 3.

In order to ensure the optimized strength of the back plate 3 when it is secured to the tensioning roller 4, and also to avoid any risk of rubbing of the tensioning roller 4 when it is in rotation with the back plate 3, the thickness of the middle zone 35 is greater than that of the central section 33, thereby forming a projecting protrusion having a plane external surface 351 oriented perpendicularly to the axis X34 towards the tensioning roller 4, and thus in the opposite direction to the outer wall on which the back plate 3 is secured.

The tensioning roller 4 having the axis X4 that the tensioning device 2 comprises is installed on the back plate 3. The tensioning roller 4 is provided with a pulley 7 having the axis X7 combined with X4, around which the belt 1 is installed. The pulley 7 is provided with a bore 71, into which is inserted a bearing 8 supporting it in rotation.

The bearing 8 has an axis X8 combined with X4 and is provided with an outer ring 81 and with an inner ring 82, defined between which is a bearing housing, into which are inserted rolling elements, in the present case being balls 83. In the example in FIG. 2, the balls are maintained in the bearing housing by a cage 84. The axes X81, X82 and X84 of the outer and inner rings and of the cage respectively are combined with the axis X8 of the bearing itself combined with the axis X4 of the tensioning roller 4 in normal operating mode.

The pulley 7 is installed securely together with the bearing 8 directly on the outer ring 81. The outer ring 81 is inserted into the bore 71 of the pulley 7. Two abutments 72 and 73 are formed in the bore 71 in order to come into contact with the outer ring 81, thereby preventing the axial displacement of the pulley 7 in relation to the outer ring 81.

The tensioning roller 4 is also provided with a roller support 9 having the axis X9 combined with the axis X4. The roller support 9 comprises a cylinder 91 and an annular disc 92 having a diameter greater than that of the cylinder 91. The inner ring 82 of the bearing 8 is provided with a bore 821 having a diameter essentially equal to that of the cylinder 91, and into which the latter is installed securely.

The inner ring 82 is maintained axially in relation to the cylinder 91 by at least two peripherally distributed material ridges 912 forming abutments against the inner ring 82, made by crimping onto the cylinder 91. On the opposite side, the annular disc 92 is in contact with the inner ring 82, similarly forming an axial abutment for the ring.

The roller support 9 is provided with a transcurrent opening 93 having the axis X93 parallel to, although not combined with, the axis X4 of the tensioning roller 4. This transcurrent opening 93 is intended to receive the screw 6, which is also received in the transcurrent opening 34, thereby permitting the tensioning roller 4 in its entirety to be maintained on the back plate 3. The roller support 9 is provided with an inner installation surface 94, which comes into contact with the external surface 351 of the back plate 3, and with an outer installation surface 95, upon which the head 61 of the screw 6 rests.

Once the tensioning roller 4 is installed on the back plate 3 and the screw 6 is in position in the transcurrent openings 34 and 93, the combined axes X34, X93 and X6 are parallel to, although not combined with, the axis X4 of the tensioning roller 4. Accordingly, when the screw 6 is not tightened, the tensioning roller 4 may be brought into a plurality of positions in rotation about the axis X6 in an eccentric manner in relation to its axis X4.

According to the present invention, the roller support 9 is provided in addition with a protuberance 96 projecting parallel to the axis X93 in the direction of the back plate 3.

This protuberance 96 engages in a peripheral recess 36 produced at the periphery on the outer edge of the surface 351 of the middle zone 35 of the back plate 3. This peripheral recess 36 is produced on a maximum of one quarter of the circumference of the surface 351 of the circular middle zone 35, which is delimited by two abutments, being upper 361 and lower 362 abutments. The peripheral recess 36 is also of box-shaped section according to an axial cross section, for example according to a plane passing through the axis X6 and the said peripheral recess 36, and in the form of a sector of a circle according to a radial cross section, for example according to a plane perpendicular to the axis X6 and intersecting the said peripheral recess 36.

Figure 3A:
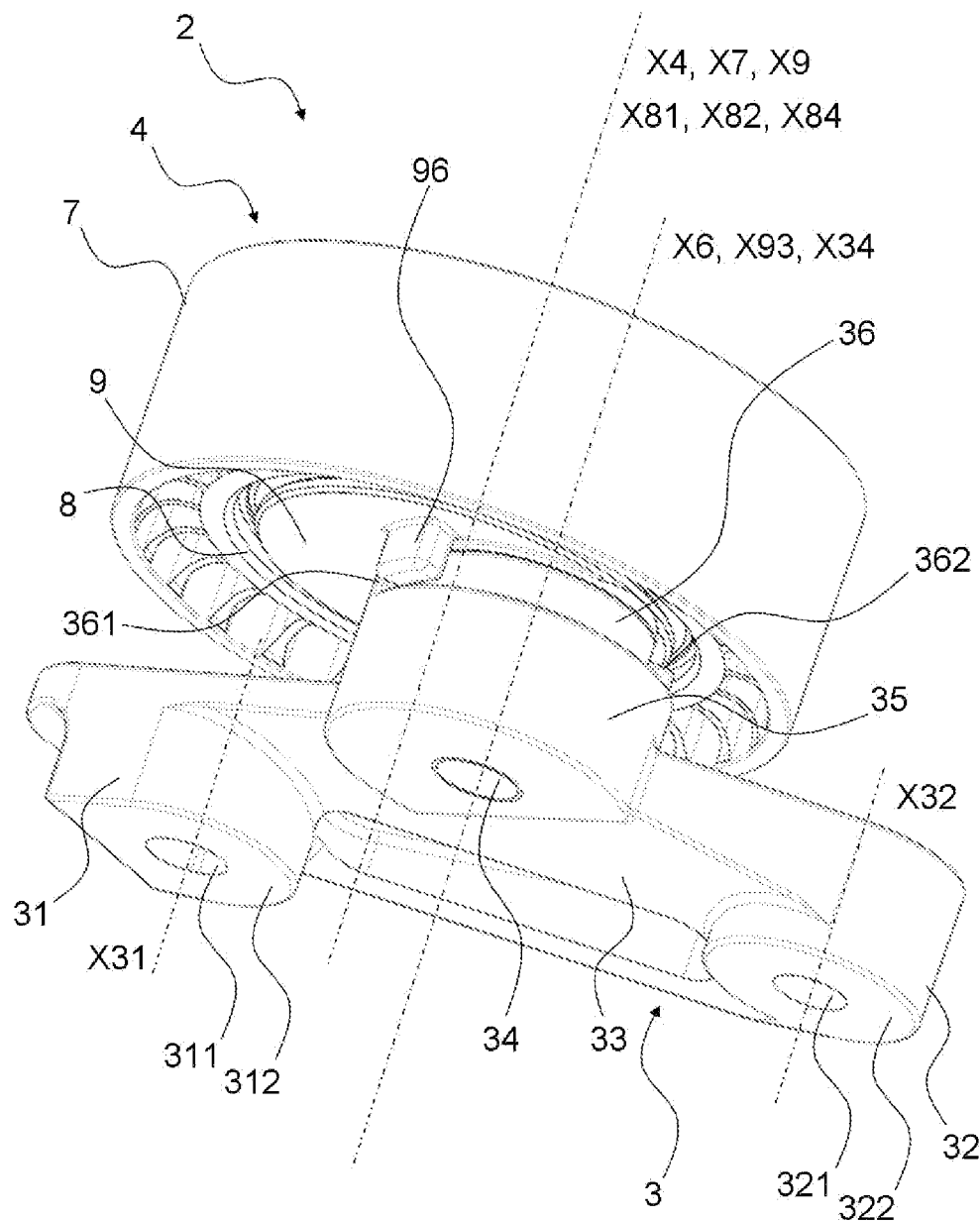
Figure 3B:
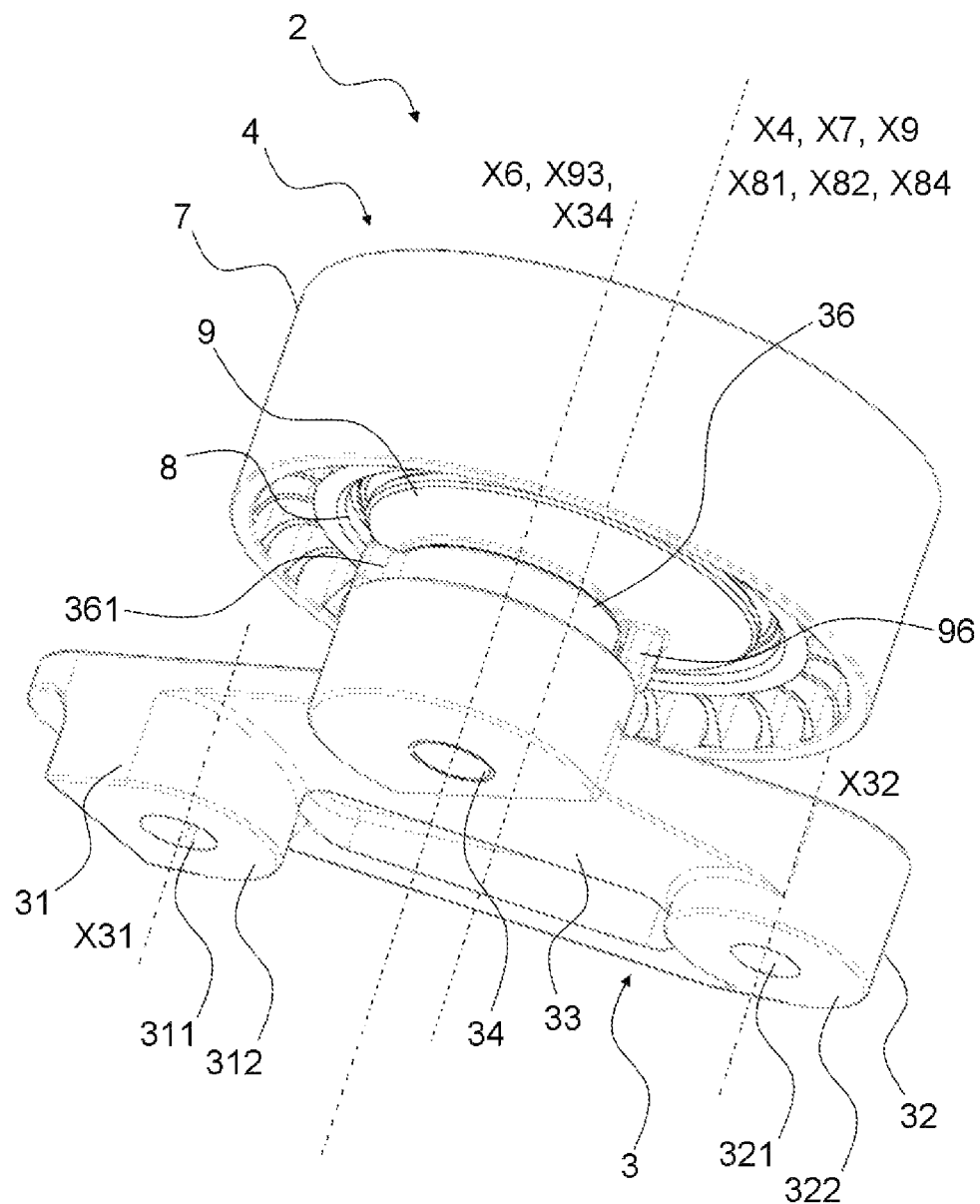

As can be appreciated from FIGS. 3a and 3b, the protuberance 96 is produced integrally with the roller support 9 by machining, although it is also possible for this protuberance to be a distinct part inserted into a dedicated opening in the roller support 9. Similarly, the box-shaped form illustrated in this case may be of a different nature, but without thereby departing from the scope of the invention.

Figure 2:
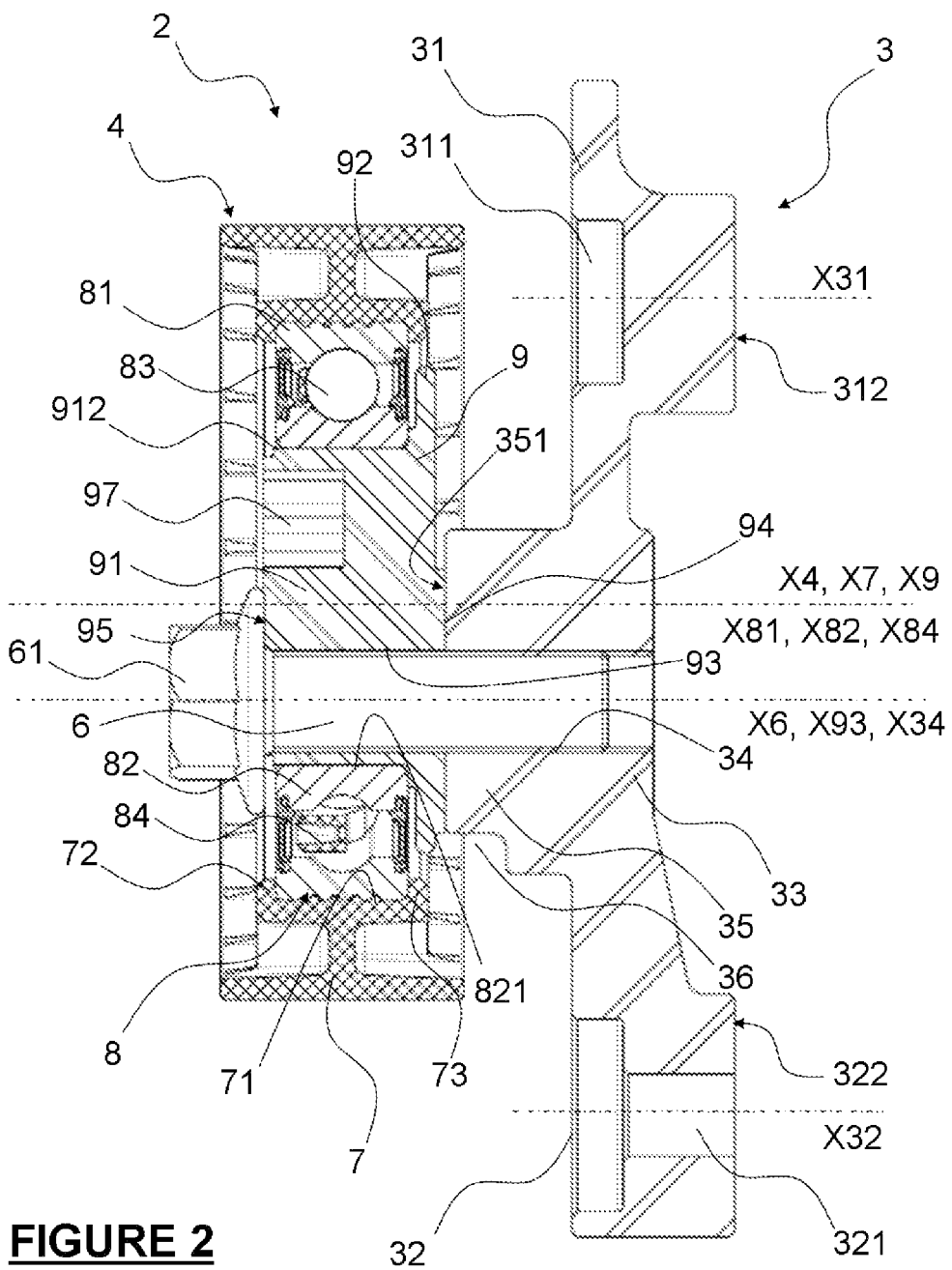
FIG. 2 is an axial cross section according to line II-II of the tensioning device in FIG. 1, and FIGS. 3a and 3b are perspective views of the tensioning device in FIGS. 1 and 2, respectively in the initial position and in the installed position.

The position of the tensioning roller 4 on the tensioning device 2 may then be defined between two positions in relation to the back plate 3 secured to the outer wall of an internal combustion engine: one position in the lower abutment corresponding to a position referred to as "initial", when the protuberance 96 is in contact with the lower abutment 362, as depicted in FIG. 3b, and one position in the upper abutment corresponding to a position referred to as "installed", when the protuberance 96 is in contact with the upper abutment 361, as depicted in FIGS. 1, 2 and 3a. The terms "upper" and "lower" are defined here in relation to the orientation in the accompanying figures.

When the tensioning roller 4 is in the "initial" position, the tensioning roller 4 obstructs the transcurrent opening 321 in the back plate 3 in a front view, whereas the transcurrent opening 311 is freely accessible to an operator for the insertion of a securing element 5 in order to secure the plaque 3 to the wall of the engine.

The belt 1, after having been installed in the traction circuit around its constituent pulleys, is in a free, untensioned position around the tensioning roller 4.

When the tensioning roller 4 must pass from the "initial" position to the "installed" position, an operator imparts a rotation to the tensioning roller about the axis X6 of the screw 6. The protuberance 96 then engages in the peripheral recess 36 between the lower abutment 362 and the upper abutment 361. This rotation of the tensioning roller 4 being eccentric in relation to its axis X4, the transcurrent opening 311 in the back plate 3 is obscured in a front view, whereas the transcurrent opening 321 becomes freely accessible to an operator for the insertion of a securing element 5 in order to secure the plaque 3 permanently to the wall of the engine.

During this rotation corresponding to putting into the "installed" position, the tensioning roller 4 exercises a force F by means of the pulley 7, acting radially in relation to the axes X4, X7 and X9, on the belt 1 in order to ensure and maintain sufficient tension.

The tensioning roller 4 is secured in this position installed on the back plate 3 in a permanent manner by an operator, who rotates the head of the screw 6 to a given torque by using a first appropriate tool, while maintaining the tensioning roller 4 in position by means of a second tool inserted into a hollow housing 97 produced in the roller support 9. This housing is blind. As a variant, it may be transcurrent, when it constitutes an opening through the roller support 9.

According to a particularly advantageous embodiment of the invention, there is an intermediate position for the protuberance 96 in the peripheral recess 36 of the back plate 3 without contact with any of the two abutments 361, 362, so that the traction means is subjected to a force F2 (not represented) exerted by the tensioning roller 4 strictly greater than F1 when the protuberance 96 is in this intermediate position.

This embodiment operates as described herein below. Once the tensioning device 2 and the tensioning roller 4 are in the "installed" position in the traction circuit, the protuberance 96 of the tensioning roller 4 is in contact with the top abutment 361 of the peripheral recess 36 and the belt 1 is subjected to a force F1. In case of release of the screw-securing 6 of the tensioning roller 4 on the back plate 3, the tensioning roller 4 will have a tendency to be set in rotation in relation to the back plate 3, in such a way that the protuberance 96 is made to move in the peripheral recess 36.

However, the protuberance 96, in approaching the intermediate position in the peripheral recess 36, demands an increase in the force exerted on the belt 1 by the tensioning roller 4 in order to apply tension to the value F2, strictly greater than F1. This creates a resistance to the rotation of the tensioning roller 4 and blocks it in this intermediate position.

The present invention also relates to an engine equipped with at least one traction circuit driven by a traction element, for example a belt 1, and equipped with a tensioning device 2 as stated above.

The present invention also relates to a method of installation of a traction element, for example a belt 1, around a tensioning device 2 as stated above according to the following successive stages:

During a preliminary stage, a traction circuit is installed on an outer wall of an engine, in particular comprising pulleys connected to engine elements and to elements to be driven. During this preliminary stage, a means of traction, in this case a belt 1, is installed around the pulleys.

A tensioning device 2 is put in position on the traction circuit, the said tensioning device 2 having a tensioning roller 4 in the "initial" position, that is to say having a protuberance 96 in contact with a lower abutment 362, installed on a back plate 3 provided with contact surfaces 312, 322 in contact with the outer wall of the engine. The belt 1 is positioned around the tensioning device 2.

With the tensioning roller 4 in the "initial" position, a transcurrent opening 311 is freely accessible by an operator, who inserts a securing element 5 into it in such a way as to secure a first extremity 31 of the back plate 3 to the outer wall of the engine.

The tensioning roller 4 is moved from the "initial" position to an "installed" position by an operator, who sets the tensioning roller 4 in rotation in relation to the back plate 3 in such a way that the protuberance 96 engages in a peripheral recess 36 in the back plate 3 between the lower abutment 362 and an upper abutment 361.

During this process of moving into the "installed" position, the belt 1 is placed under tension by the tensioning roller 4.

With the tensioning roller 4 in the "installed" position, a transcurrent opening 321 is freely accessible by an operator, who inserts a securing element 5 there in such a way as to secure a second extremity 32 of the back plate 3 permanently to the outer wall of the engine.

At the same time, an operator tightens a screw head 61 of a screw 6 to a given torque with a first appropriate tool, while maintaining the tensioning roller 4 in position by the insertion of a second tool into a housing 97 made on the external surface 91 of the tensioning roller 4, in such a way as to secure the tensioning roller 4 in position on the back plate 3.

The invention claimed is:

1. A tensioning device comprising:
a back plate configured to be secured to a wall by inserting at least two back plate securing elements through a respective one of at least two back plate mounting transcurrent openings therein, wherein the back plate is fixed with respect to the wall such that the back plate cannot pivot with respect to either of the at least two securing elements when the at least two back plate securing elements are engaged with the at least two back plate mounting transcurrent openings and the wall, and
a tensioning roller installed onto the back plate, the tensioning roller including;
at least one bearing, and
a pulley supported by the at least one bearing, the tensioning roller being installed on the back plate with a tension roller axis (X4) capable of rotating about an eccentric axis (X6) during installation of the tensioning device, the tensioning device is configured such that the tension roller axis (X4) is fixed during normal operation, and the tensioning roller is provided with a protuberance engaged in a peripheral recess produced exclusively on the periphery at the outer edge of a zone projecting from the back plate, the peripheral recess limiting the movement of the protuberance between two abutments wherein when the protuberance abuts either of the abutments the tensioning roller axially overlaps at least one of the back plate mounting transcurrent openings located in the back plate, the peripheral recess being configured for moving the tensioning roller prior to fixing the tension roller axis (X4) for normal operation of the tensioning device, wherein the tensioning device is free of springs.

2. The tensioning device according to claim 1, wherein the at least one bearing is installed securely on a roller support that is provided with the protuberance.

3. The tensioning device according to claim 2, wherein the peripheral recess is produced on a maximum of one half of the circumference of the projecting zone.

4. The tensioning device according to claim 1, wherein the peripheral recess is in the form of a sector of a circle according to a radial cross section in relation to the eccentric axis (X6) about which the tensioning roller can move on the back plate during installation.

5. The tensioning device according to claim 1, further comprising a screw inserted into a first screw transcurrent opening in the tensioning roller and into a second screw transcurrent opening in the back plate, the eccentric axis (X6) of the screw being parallel although not combined with, the tension roller axis (X4).

6. The tensioning device according to claim 1, wherein a traction element is subjected to a force (F1) exerted by the tensioning roller when the protuberance is in contact with the abutment corresponding to a final installed position of the tensioning device in the traction circuit.

7. The tensioning device according to claim 3, wherein the peripheral recess is produced on one quarter of the circumference of the projecting zone.

8. The tensioning device according to claim 6, wherein the peripheral recess is configured such that if during use the tensioning device malfunctions and the tensioning roller axis is no longer fixed, the tensioning roller will be biased into the proper position by the traction element being subjected to a force (F2) exerted by the tensioning roller greater than (F1) when disposed in an intermediate position of the protuberance in the peripheral recess of the back plate, with no contact with any of the two abutments, thus providing an anti-return feature.

9. An engine equipped with at least one traction circuit driven by a traction element and equipped with a tensioning device, the tensioning device comprising:

a back plate configured to be secured to a wall by inserting at least two back plate securing elements through a respective one of at least two back plate mounting transcurrent openings therein, wherein the back plate is fixed with respect to the wall such that the back plate cannot pivot with respect to either of the at least two securing elements when the at least two back plate securing elements are engaged with the at least two back plate mounting transcurrent openings and the wall, and a tensioning roller installed onto the back plate, the tensioning roller including;
at least one bearing, and
a pulley supported by the at least one bearing, the tensioning roller being installed on the back plate with a tension roller axis (X4) capable of rotating about an eccentric axis (X6) during installation of the tensioning device, the tensioning device is configured such that the tension roller axis (X4) is fixed during normal operation, and the tensioning roller is provided with a protuberance engaged in a peripheral recess produced exclusively on the periphery at the outer edge of a zone projecting from the back plate, the peripheral recess limiting the movement of the protuberance between two abutments wherein when the protuberance abuts either of the abutments the tensioning roller axially overlaps at least one of the back plate mounting transcurrent openings located in the back plate, the peripheral recess being configured for moving the tensioning roller prior to fixing the axis (X4) for normal operation of the tensioning device, wherein the tensioning device is free of springs.

\* \* \* \* \*